United States Patent [19]

Rapisarda

[11] Patent Number: 5,019,438

[45] Date of Patent: May 28, 1991

[54] LEATHER ARTICLE DECORATED WITH LIGHT EMITTING DIODES

[76] Inventor: Carmen Rapisarda, 1715 Edgecomb, Covina, Calif. 91724

[21] Appl. No.: 437,193

[22] Filed: Nov. 16, 1989

[51] Int. Cl.[5] .......................... B32B 9/02; D06C 23/00

[52] U.S. Cl. .......................................... 428/102; 2/69; 156/93; 362/103; 362/800; 428/473

[58] Field of Search ..................... 428/7, 40, 102, 473; 156/93; 362/103, 806, 800; 2/69, 94

[56] References Cited

U.S. PATENT DOCUMENTS

| | | | |
|---|---|---|---|
| 3,894,225 | 7/1975 | Chao | 428/7 X |
| 4,107,767 | 8/1978 | Anquetin | 428/40 X |
| 4,164,008 | 8/1979 | Miller et al. | 362/806 X |
| 4,173,035 | 10/1979 | Hoyt | 428/40 X |
| 4,340,976 | 7/1982 | Wright | 428/473 X |
| 4,510,188 | 4/1985 | Ruggeri | 428/473 X |
| 4,570,206 | 2/1986 | Deutsch | 362/800 X |
| 4,599,682 | 7/1986 | Stephens | 362/800 X |
| 4,602,191 | 7/1986 | Davila | 362/800 X |
| 4,774,642 | 9/1988 | Janko | 362/103 X |
| 4,935,851 | 6/1990 | Wood | 362/800 X |

FOREIGN PATENT DOCUMENTS

| | | | |
|---|---|---|---|
| 2520597 | 8/1983 | France | 2/69 |

*Primary Examiner*—Henry F. Epstein
*Attorney, Agent, or Firm*—Edgar W. Averill, Jr.

[57] ABSTRACT

A leather article decorated with light emitting diodes. The article has first and second lengths of flat, braided conductors sewn to thee back surface with a gap between the two lengths. Holes are formed through the leather between the two lengths of conductors and the light emitting diode is secured by its leads to the two lengths so that it protrudes through the leather. Lengths are connected to a battery and a switch so that the decorated area may be turned off or on as desired.

5 Claims, 1 Drawing Sheet

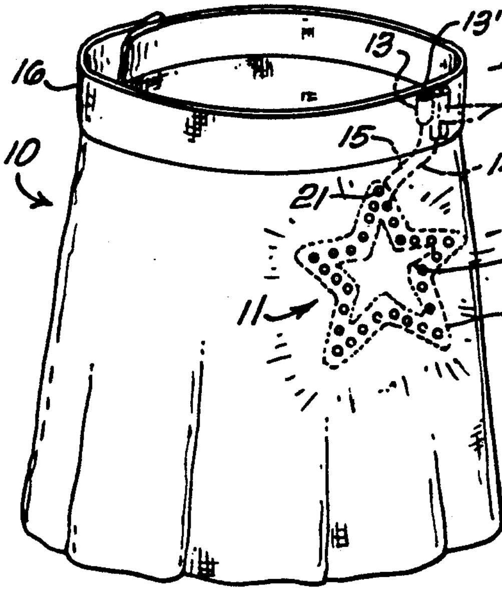
FIG. 1.
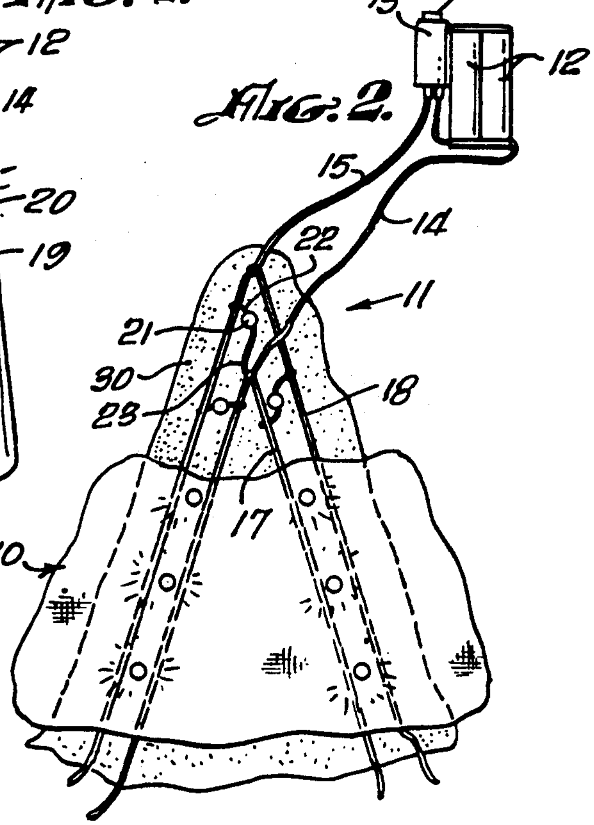
FIG. 2.
FIG. 3.
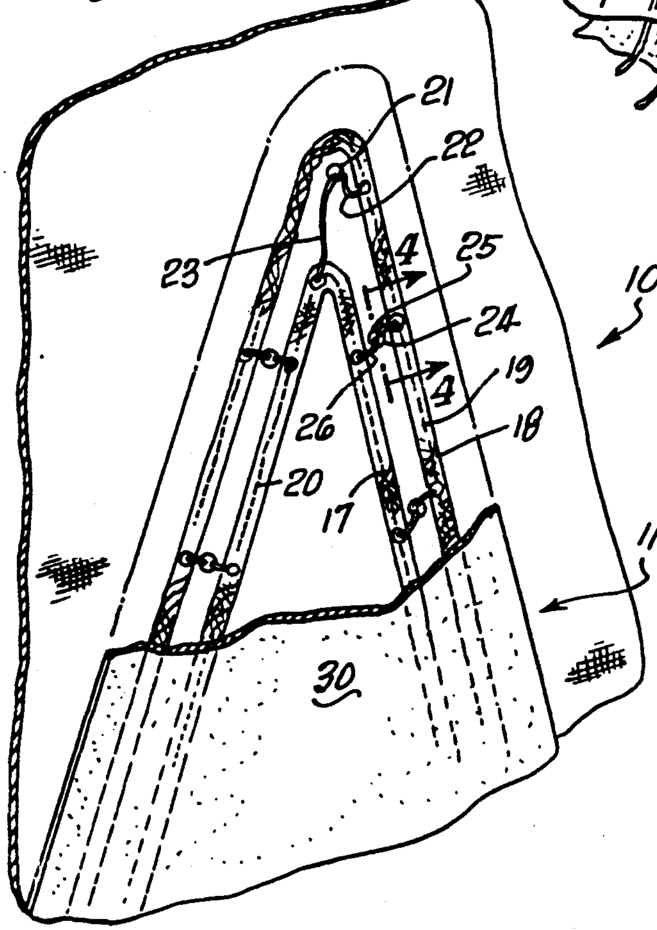
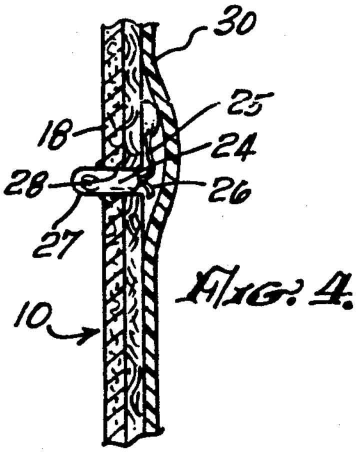
FIG. 4.

LEATHER ARTICLE DECORATED WITH LIGHT EMITTING DIODES

BACKGROUND OF THE INVENTION

The field of the invention is decorative clothing, and the invention relates more particularly to leather or leather-like articles which may be brightly decorated with lights.

In clothing for use by dancers, or in other theatrical applications, it is often desired to provide a highly decorative and spectacular appearance. While sequins and jewels have been used for many years, an even more spectacular effect is created by electric lights. It is generally considered impractical, however, to provide such decoration.

SUMMARY OF THE INVENTION

It is an object of the present invention to decorate a leather-like article with light emitting diodes.

The present invention is for a leather article decorated with light emitting diodes. The area to be decorated has an outer surface and an inner surface, and first and second lengths of flat, braided conductors are sewn against the inner surface in a parallel manner but separated apart so that they do not touch. A plurality of holes is formed between the first and second lengths of conductors, and a plurality of light emitting diodes are placed so that their lens portion protrudes through the holes, and the leads thereto are connected preferably by soldering to the first and second lengths of braided conductor. The two conductors are then connected through a switch to battery means, and the result is a highly decorative, controllable light pattern on the exterior of the leather article. The process for forming this article is also set forth herein comprising sewing the two lengths of braided conductor to the inner surface of the area to be decorated, forming holes between the two lengths, inserting light emitting diodes through the holes and soldering them to the conductors.

BRIEF DESCRIPTION OF THE DRAWINGS

FIG. 1 is a perspective view of a leather garment decorated with a plurality of light-emitting diodes.

FIG. 2 is an enlarged back view showing the back of a portion of the decoration of the garment of FIG. 1.

FIG. 3 is a further enlarged portion of the decoration of the garment of FIG. 1 as shown from the interior of the garment.

FIG. 4 is a cross-sectional view taken along line 4—4 of FIG. 3.

DESCRIPTION OF THE PREFERRED EMBODIMENTS

A leather skirt is shown in perspective view in FIG. 1 and indicated by reference character 10. Skirt 10 has a lighted star decoration 11, a pair of batteries 12, a switch 13, and a pair of wires 14 and 15 are held in a belt area 16 of skirt 10. The decoration 11 can be turned on by pressing the button on switch 13 and may also be turned off. Further electrical circuit means may be provided to cause a flashing effect in the light emitting diodes.

In FIG. 2, the lighted star decoration 11 is shown from the rear view where it can be seen that the decoration is energized by a pair of flat, braided conductors 17 and 18 to which wires 14 and 15 are soldered. The connection of wires 14 and 15 with battery 12 and switch 13 is also shown in FIG. 2. Wires 14 and 15 should be flexible so that they do not interfere with the drape of the garment. The switch button is indicated by reference character 13′, Further details of construction are shown in FIG. 3 which is an enlarged view from the inner surface of skirt 10. There it can be seen that flat, braided conductor 18 is sewn to skirt 10 by a length of stitching 19. In FIG. 1, it can also be seen that this stitching 19 shows through the front of the garment and adds further decoration to the outer surface thereof. Similarly, flat, braided conductor 17 is sewn by a length of stitching 20 which also shows through the garment.

Light emitting diode (LED) 21 is shown in FIG. 3 and has a lead 22 soldered to flat, braided conductor 18 and a lead 23 soldered to flat, braided conductor 17. Similarly, light emitting diode 24 has a lead 25 soldered to conductor 18 and a lead 26 soldered to conductor 17. LED 25 is shown in enlarged cross-sectional view in FIG. 4 where it can be seen that the LED has a lens portion 27 which extends through a hole 28 formed through leather skirt 10. The leads serve to hold the lens 27 in hole 28 and to cause it to protrude therefrom. This provides an exceptionally bright and spectacular display when the design is energized. Also shown in FIG. 4 is a heat sealed insulative cover sheet 30 which helps to hold the conductors from contacting one another in the event that the design is severely folded during wear. This is preferably a fabric with a heat activated delayed tack adhesive on the back thereof of the type commonly used in garment making.

While the term "leather" has been used herein, the term is intended in its broadest sense to also include any leather-like fabric, velvet, denim or the like. It is important that the fabric have sufficient body so that the conductor does not detract from the appearance thereof, but it is not intended that the device be limited strictly to leather.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A leather article decorated with light emitting diodes comprising:

- an area of flexible leather having an outer surface and an inner surface;
- a first length of flat, braided conductor sewn against the inner surface of said area of flexible leather;
- a second length of flat, braided conductor sewn against the inner surface of said area of flexible leather, said second length being sewn parallel to but spaced from said first length;
- a plurality of holes formed in said area of leather between said first and second lengths;
- a plurality of light emitting diodes, each diode having a lens portion, and a first and a second lead extending therefrom and positioned on the back of said area of leather, each first lead being electrically connected to said first length of flat, braided conductor and each second lead being electrically connected to said second length of flat, braided conductor, and said lens portion of each light emitting diode extending through one of said plurality of holes in said area of leather; and battery means connected through switch means to said first and second lengths whereby when said switch means is closed, the light emitting diodes are energized.

2. The leather article of claim 1 wherein the first and second lengths of flat, braided conductors each form a closed loop

3. The leather article of claim 1 further including a flexible insulative layer affixed over said two lengths of flat, braided conductors.

4. The leather article of claim 1 wherein said battery means and said switch means are connected to said first and second lengths of flat, braided conductors through a length of flexible conductor so that the resulting circuit may be energized from a remote location.

5. A process for forming a decorative design in an area of leather with a plurality of light emitting diodes, said process comprising the steps of:

sewing a first length of flat, braided conductor to the inner surface of an area of leather to be decorated, said first length being sewn in the approximate shape of the design to be made;

sewing a second length of flat, braided conductor to the inner surface of the area of leather to be decorated, said second length being sewn parallel to and closely spaced apart from said first length of flat, braided conductor;

forming a plurality of holes in the leather between said first and second conductors;

inserting a light emitting diode through each hole from the back of said area of leather and leaving the leads of the diodes on the back surface of said area of leather;

soldering the leads of said diodes to said first and second lengths of flat, braided conductors; and connecting battery and switch means between said first and second lengths of flat, braided conductors.

* * * * *